April 12, 1938. M. W. McCONKEY 2,113,736
CHART MOUNTING FOR INSTRUMENTS
Filed Jan. 11, 1936
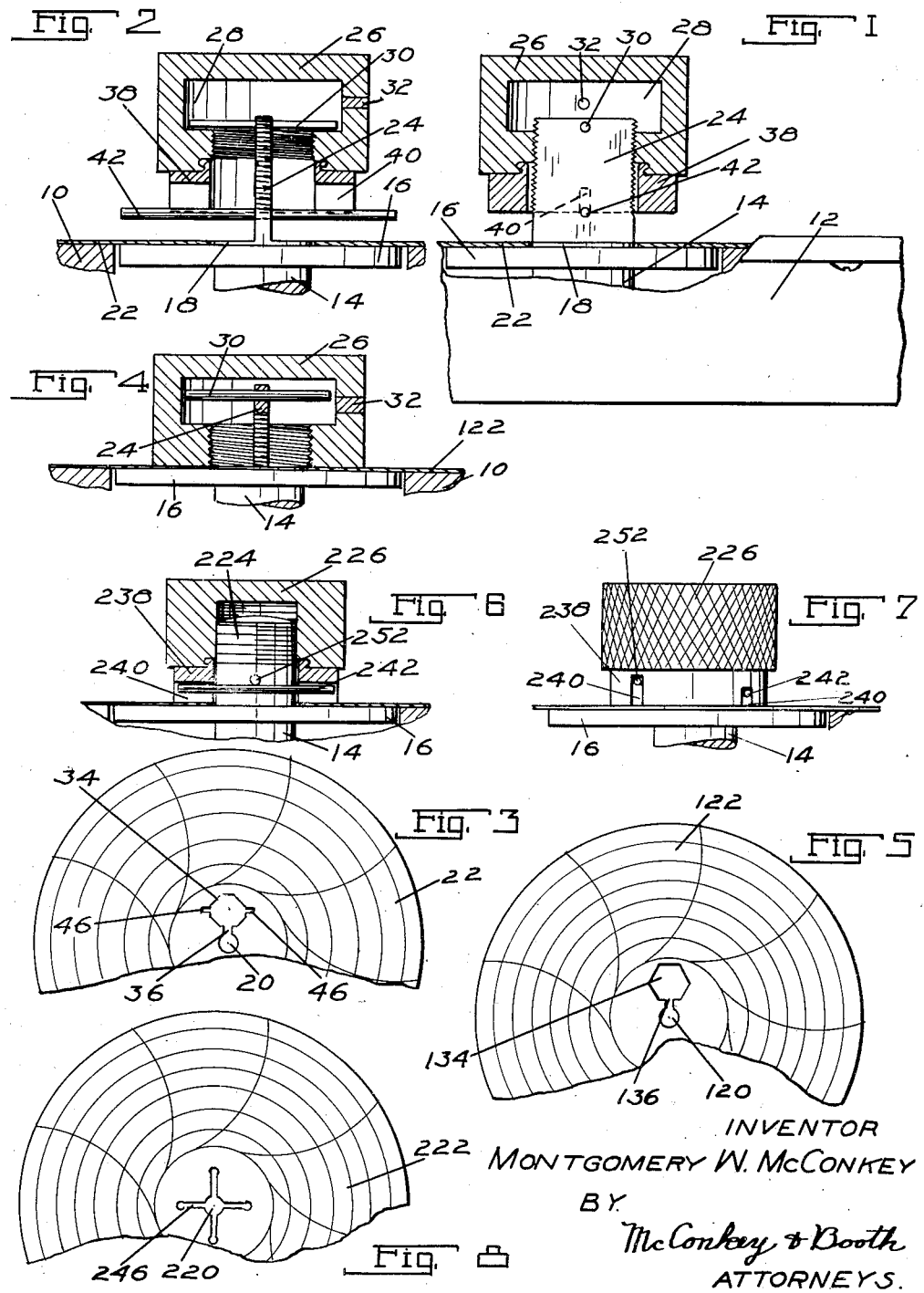

Patented Apr. 12, 1938

2,113,736

UNITED STATES PATENT OFFICE 2,113,736

CHART MOUNTING FOR INSTRUMENTS

Montgomery W. McConkey, Chicago, Ill., assignor to Republic Flow Meters Company, Chicago, Ill., a corporation of Illinois Application January 11, 1936, Serial No. 58,632

11 Claims. (Cl. 234—75)

This invention relates to instruments, especially those of the recording type, and has to do mainly with facilitating the insertion and removal and accurate centering of the charts used in such instruments.

One feature of the invention has to do with providing a clamp nut or the like, which can be manipulated to secure a chart in centered position on a driving post, with a clamp member which is rotatably secured to its base and which is keyed to the driving post so that it is held against turning as the nut is turned down, whereby there is no chance of unintended movement of the chart after it is adjusted, during the final operation of securing it in place. Preferably the keys are in the form of one or a pair of pins driven through and projecting from the driving post and seated in key slots formed in the lower face of the clamp member.

The charts for use with this novel drive mechanism have slots or the like openings to go over the pins when the charts are inserted in or removed from the instrument. They also, of course, have the usual central opening which seats on the driving post and centers the indicia on the chart relatively to the recording mechanism.

Another feature of the invention relates to guarding against losing the clamp nut, by providing means preventing its removal from the driving post. For example, the end of the post may have a retaining pin driven there-through and which is of greater length than the diameter of the threaded opening in the clamp nut.

To facilitate the insertion and removal of the charts when the nut is so made a permanent part of the post assembly, each chart has (at one side of the central centering opening) an opening of such size and shape as to pass readily over the clamp nut, whereupon the chart is shifted parallel to its own plane to bring the center opening about the post below the clamp nut.

To facilitate this last operation, the two openings in the chart may be connected by a relatively narrow passage, and the driving post may have a flat portion formed with a corresponding thickness, and which is threaded on its edges to receive the clamp nut.

The above and other objects and features of the invention, including various novel combinations of parts and desirable particular constructions, will be apparent from the following description of the illustrative embodiments shown in the accompanying drawing, in which:

Figure 1 is a partial section through the panel of a recording instrument, showing the driving post and the mounting of the chart thereon;

Figure 2 is a section therethrough at right angles to Figure 1;

Figure 3 is a partial plan view of the chart used in the instrument of Figures 1 and 2;

Figure 4 is a partial section through a modified form of instrument;

Figure 5 is a partial plan view of the chart used in the instrument of Figure 4;

Figure 6 is a partial section through a third modification;

Figure 7 is a side elevation of the parts shown in Figure 6; and

Figure 8 is a partial plan view of the chart used in the instrument of Figures 6 and 7.

In the arrangement illustrated in Figures 1 and 2, the instrument panel is shown at 10, and is formed with an opening back of which is mounted a clock mechanism 12 having a driving post 14 extending through the opening and provided with a chart-supporting part such as a flange 16 the face of which is in the same plane as the face of the panel. These particular parts of the instrument may be the same in the embodiments of Figures 4, 6, and 7.

Above the face of the flange 16 is a cylindrical portion 18 of the driving post, intended to seat in a central circular opening 20 of a chart 22, to center relatively to the axis of the post 14 the indicia printed on the face of the chart, and relatively to which the pen (not shown) makes its record.

The driving post is continued, in front of the centering portion 18, as a thin extension 24 threaded on its edges to receive a clamp nut 26. This nut is preferably formed with an internal chamber or recess 28, considerably greater in diameter than the threaded part of the nut, receiving a retaining pin 30 driven through the end of the extension 24, and serving to prevent the complete removal of the nut from the driving post. The pin 30 may initially be inserted through an opening in the side wall of the nut 26 which is then closed by a suitable plug 32.

The chart 22 is formed with an opening 34 at one side of the central opening 20, of such size and shape as to pass readily over the clamp nut 26 in inserting or removing the chart. The openings 20 and 34 are connected by a passage 36, slightly wider than the thickness of the extension 24, so that after a chart has been inserted by slipping the opening 34 over the nut 26, it may readily be shifted parallel to its own plane, with the extension 24 passing through the passage 36, until the opening 20 is over the cylindrical centering portion 18.

The nut 26 preferably has rotatably mounted on its base a clamp member 38 which may be connected to the nut by spinning or pressing an annular flange thereon into a suitable groove in the nut and the lower face of which is formed with a transverse slot 40 adapted to embrace a key pin 42 driven through the extension 24. Thus the pin 42 holds the clamp member 38 against turning, as the nut 26 is tightened, thereby guarding against unintended shifting of the chart 22.

The chart 22 has slots 46 at opposite sides of the opening 34, to slip over the ends of the pin 42 when the chart is inserted or removed.

The embodiment of Figure 4 differs from that of Figures 1 and 2 in the omission of the clamp member 38 and its key pin 42. The chart 122 for this instrument is formed with openings 120 and 134 connected by a passage 136, substantially the same in arrangement as the openings 20 and 34 and passage 36, but does not have the slots 46 for the ends of the pin 42.

In the embodiment of Figures 6 and 7, the clamp nut 226 rotatably carries a clamp member 238 formed in its base with two diametrical slots 240 at right angles to each other. These slots seat over key pins 242 and 252 at right angles to each other and driven through a post extension 224, which in this case is circular in outline instead of flattened like the extension 24.

The chart 222 for this instrument has a central circular centering opening 220, from which extend slots 246 adapted to pass readily over the pins 242 and 252 when the chart is inserted or removed.

While several illustrative embodiments have been described in detail, it is not my intention to limit the scope of the invention to those particular embodiments or otherwise than by the terms of the appended claims.

I claim:

1. A chart mounting for an instrument having a driving post formed with a chart-supporting part, said post having in front of said part a chart-centering portion of circular outline and a relatively thin projection extending beyond said portion and threaded on its outer edges and having a pin projecting therethrough, said chart mounting comprising a nut threaded on said projection and rotatably secured to a clamp member having in its base a slot embracing said pin to prevent said member from turning, and a chart clamped against the chart-supporting part by said clamp member and having a central circular opening embracing said circular portion and having a slot extending at one side of said opening of a width slightly greater than the thickness of said projection and communicating with an opening slightly larger than said nut and having side portions long enough for said pin to pass through, to facilitate removal of said chart as described.

2. A chart mounting for an instrument having a driving post formed with a chart-supporting part, said post having in front of said part a chart-centering portion of circular outline and a relatively thin projection extending beyond said portion and threaded on its outer edges and having a pin projecting therethrough, said chart mounting comprising a nut threaded on said projection and rotatably secured to a clamp member having in its base a slot embracing said pin to prevent said member from turning, and a chart clamped against the chart-supporting part by said clamp member and having a central circular opening embracing said circular portion and having a slot extending at one side of said opening of a width slightly greater than the thickness of said projection and communicating with an opening slightly larger than said nut and having side portions long enough for said pin to pass through, to facilitate removal of said chart as described, said projection and said nut having means preventing removal of the nut from said projection.

3. A chart mounting for an instrument having a driving post formed with a chart-supporting part, said post having in front of said part a chart-centering portion of circular outline and a relatively thin projection extending beyond said portion and threaded on its outer edges and having a pin projecting therethrough, said chart mounting comprising a nut threaded on said projection and rotatably secured to a clamp member having in its base a slot embracing said pin to prevent said member from turning, and a chart clamped against the chart-supporting part by said clamp member and having a central circular opening embracing said circular portion and having a slot extending at one side of said opening of a width slightly greater than the thickness of said projection and communicating with an opening slightly larger than said nut and having side portions long enough for said pin to pass through, to facilitate removal of said chart as described, said projection having a pin through its end and said nut having an internal chamber receiving said pin and having its threaded portion arranged beneath the pin and smaller in diameter than the length of said pin.

4. A chart mounting for an instrument having a driving post formed with a chart-supporting part, said post having in front of said part a chart-centering portion of circular outline and a relatively thin projection extending beyond said portion and threaded on its outer edges and having a pin projecting therethrough, said chart mounting comprising a nut threaded on said projection and rotatably secured to a clamp member having in its base a slot embracing said pin to prevent said member from turning.

5. A chart mounting for an instrument having a driving post formed with a chart-supporting part, said post having in front of said part a chart-centering portion of circular outline and a relatively thin projection extending beyond said portion and threaded on its outer edges and having a pin projecting therethrough, said chart mounting comprising a nut threaded on said projection and rotatably secured to a clamp member having in its base a slot embracing said pin to prevent said member from turning, said projection and said nut having means preventing removal of the nut from said projection.

6. A chart mounting for an instrument having a driving post formed with a chart-supporting part, said post having in front of said part a chart-centering portion of circular outline and a relatively thin projection extending beyond said portion and threaded on its outer edges and having a pin projecting therethrough, said chart mounting comprising a nut threaded on said projection and rotatably secured to a clamp member having in its base a slot embracing said pin to prevent said member from turning, said projection having a pin through its end and said nut having an internal chamber receiving said pin and having its threaded portion arranged beneath the pin and smaller in diameter than the length of said pin.

7. In an instrument having a chart-driving post the combination of means for clamping a chart to said post comprising two parts one of which is threaded on the post and the other of which is a clamp member rotatably secured to the base of said one part and surrounding said post, and means carried by the post preventing the clamp member from turning when the said one part is turned down to clamp a chart in place.

8. A chart mounting for an instrument comprising a chart-driving post having a chart-supporting part and a threaded projection in front of said part, said projection having a pin extending therethrough, a nut threaded on said projection and carrying a clamp member having in its base a slot embracing said pin to prevent said member from turning, and a chart clamped against said chart-supporting part by said clamp member and having a central opening encircling said projection and having a communicating opening longer than said pin to permit removal of the chart over said pin.

9. In an instrument having a chart-driving post having a chart-supporting part and a threaded projection in front of said part, said projection having a pin extending therethrough, the combination of a chart mounting comprising a nut threaded on said projection and a clamp member rotatably secured to said nut and having in its base a slot embracing said pin to prevent said member from turning.

10. In an instrument having a driving post formed with a screw threaded portion, the combination of means for clamping a chart to the post comprising a nut threaded on the post, said nut having an internal cavity in its upper portion and a throat of smaller diameter than the cavity in its lower portion, and a member carried by the post and lying in said cavity to prevent removal of the nut from the post.

11. In an instrument having a driving post formed with a portion of reduced cross section and with a screw threaded portion, the combination of means for clamping a chart to said post comprising a nut threaded on said post and formed with an internal annular cavity adjacent its upper end, and with a throat of smaller diameter than the cavity adjacent its lower end and a pin carried by the post and extending into said cavity to prevent removal of the nut from the post.

MONTGOMERY W. McCONKEY.